UNITED STATES PATENT OFFICE.

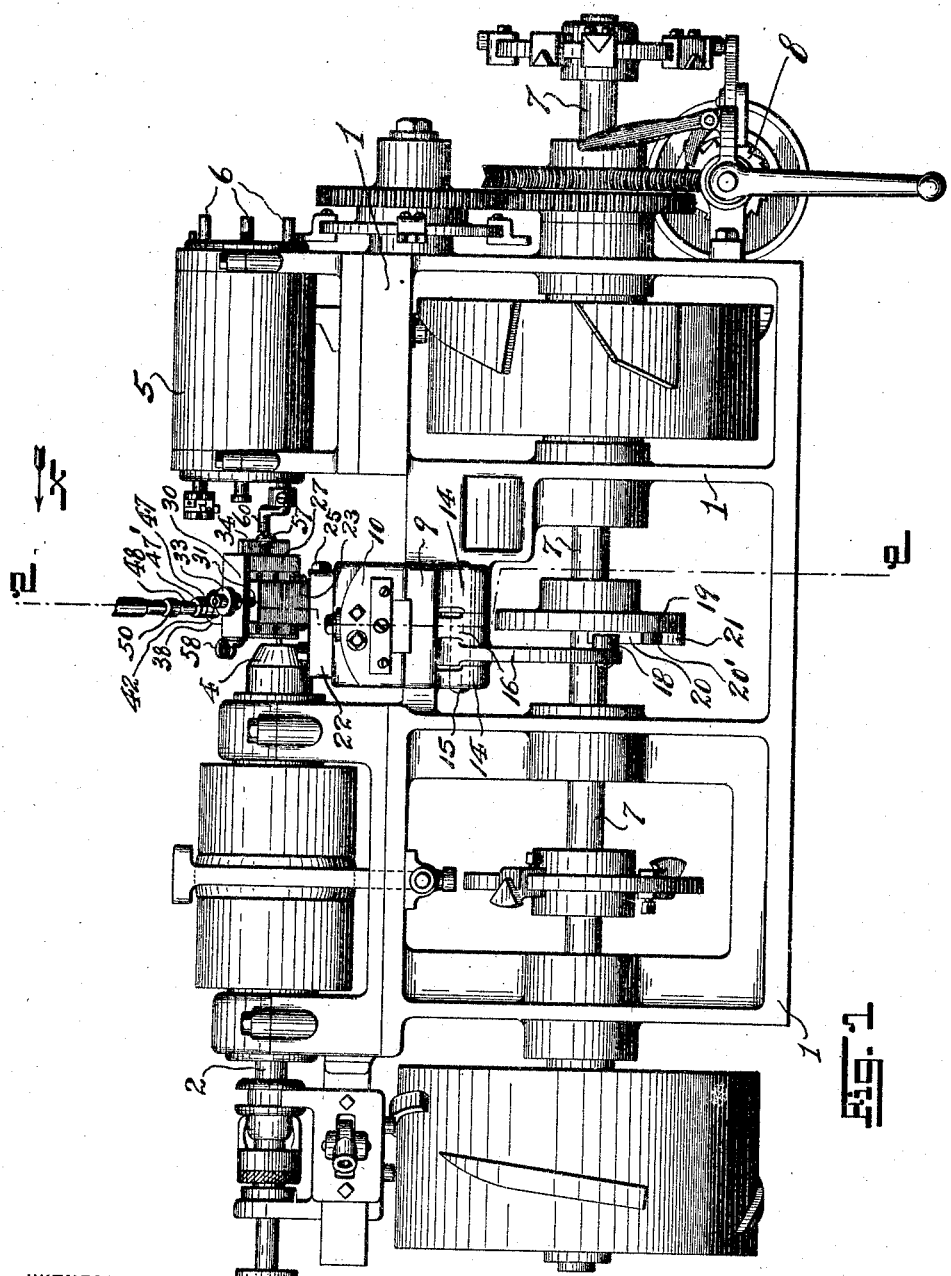

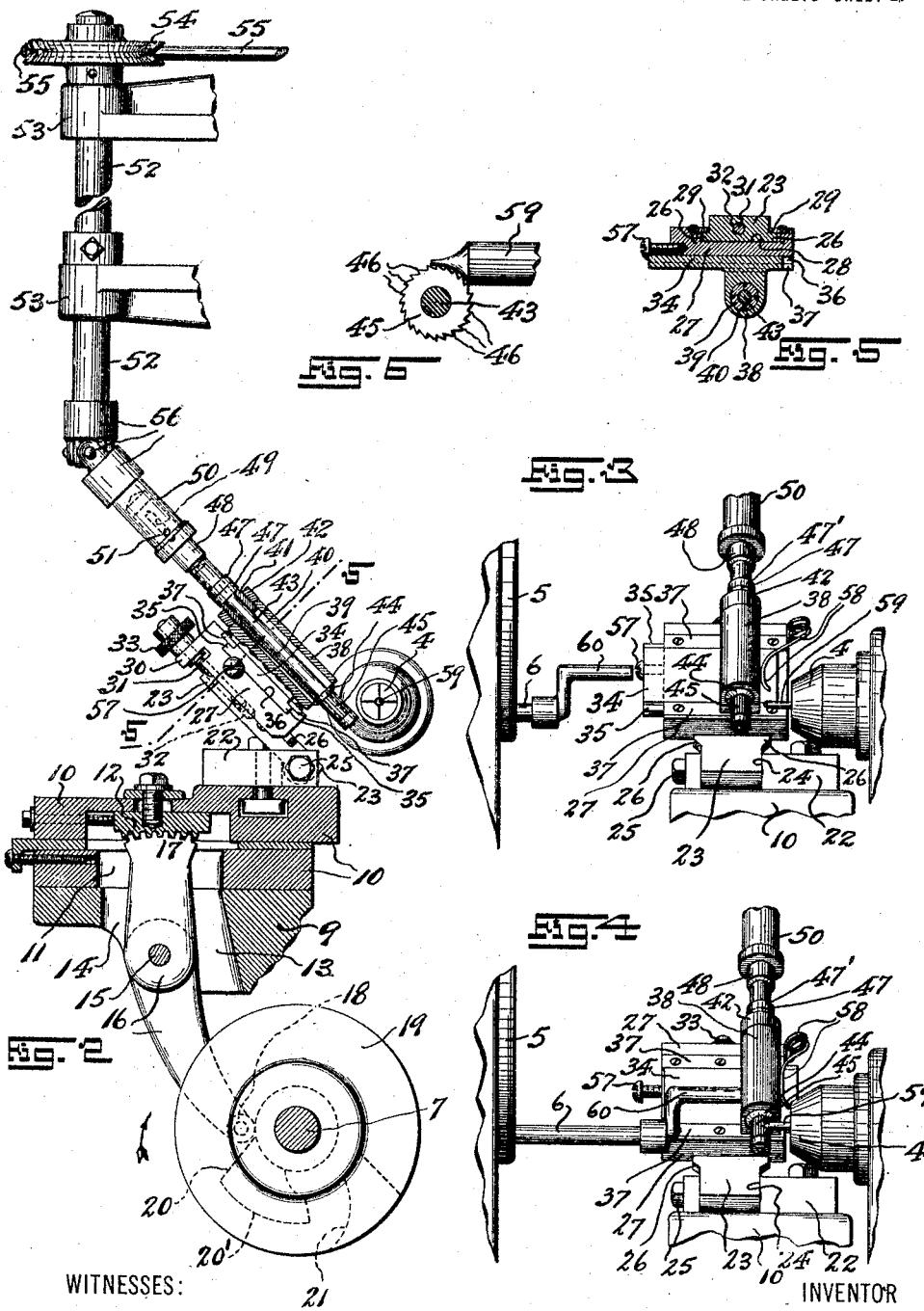

HENRY BAMBERGER, OF NEWARK, NEW JERSEY, ASSIGNOR TO ELLIS S. OLIVER, OF NEWARK, NEW JERSEY.

SCREW-MACHINE ATTACHMENT.

1,303,152. Specification of Letters Patent. Patented May 6, 1919.

Application filed March 9, 1918. Serial No. 221,367.

*To all whom it may concern:*

Be it known that I, HENRY BAMBERGER, a citizen of the United States, residing at Newark, in the county of Essex and State of New Jersey, have invented certain new and useful Improvements in Screw-Machine Attachments; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in automatic machines for producing pins, studs, phonograph needles, metal screws, etc., commonly known as automatic screw machines; and the invention has reference, more particularly, to a novel attachment for carrying on a milling operation as one of the functions of said machine.

The invention has for its principal object to provide an automatic milling attachment for screw machines the operation of which is automatically synchronized with the other functional operations of the machine, and which is adapted to perform pointing operations upon material undergoing the process of manufacture to produce such articles as phonograph needles, and the like.

The invention has for a further object to provide a novel milling attachment comprising a rotating milling tool and mounting therefor, means for automatically moving said tool to working position, and means for feeding said tool against the work while performing its function.

Other objects of the present invention, not at this time more particularly enumerated, will be clearly understood from the following detailed description of the same.

With the various objects of the present invention in view, the same consists primarily, in the novel milling attachment for automatic screw machines hereinafter set forth; and, the invention consists, furthermore, in the novel arrangements and combinations of the various devices and parts, as well as in the details of the construction of the same, all of which will be hereinafter more fully described, and then finally embodied in the claims appended to this specification.

The invention is clearly illustrated in the accompanying drawings, in which:—

Figure 1 is a side elevation of an automatic screw machine equipped with the novel milling attachment made according to and embodying the principles of the present invention.

Fig. 2 is a detail transverse section taken on line 2—2 in said Fig. 1, looking in the direction of the arrow $x$, said view being drawn on an enlarged scale, and the same illustrating, furthermore, one means of transmitting rotary movement to the milling tool.

Fig. 3 is a detail front elevation of the novel milling attachment in normal initial position relative to the work; and Fig. 4 is a similar view of the same in operative relation to the work.

Fig. 5 is a detail transverse section taken on line 5—5 in Fig. 2, looking downward.

Fig. 6 is a detail view illustrating the relation of the milling tool to the work during the fulfilment of its function.

Similar characters of reference are employed in all of the hereinabove described views, to indicate corresponding parts.

Referring now to the said drawings the reference character 1 indicates the fixed frame of the automatic screw machine, upon which is mounted the main spindle mechanism 2 which receives and rotates the wire or rod 3 providing the raw material, said spindle 2 having the usual chuck 4 for gripping said material 3. Mounted upon the opposite end of the frame 1 is the automatically rotated turret 5 provided with the usual sliding spindles 6 adapted to carry the various cutting tools and positioning stops usual to the screw machine. The reference character 7 indicates the main shaft upon which are mounted the several cam-wheels for automatically operating and timing the various mechanisms performing the functions of the machine, said shaft 7 being driven by the usual transmission mechanism 8.

Connected with said frame 1, in proper location so as to be disposed between the spindle chuck 4 and the turret 5, is a transverse cross slide bracket 9, upon which is slidably mounted a cross slide 10. Said cross slide is slotted or hollowed out at its under side, as at 11, to provide space for the connection therewith of a toothed rack-block 12. In like manner, said cross slide bracket 9 is slotted, as at 13, and is provided at the sides of said slotted portion with depending bearing ears 14 in which is supported the journal pin 15. Pivotally mounted upon said journal pin 15 is a cross slide lever 16, the upper arm of which is provided with a gear segment 17 operatively meshing with said rack-block 12, and the lower arm of which is provided at its extremity with an off-set roller 18. Mounted upon said shaft 7, so as to rotate therewith, is a cam-disk 19 provided upon its face, opposite said lower arm of said lever 16, with a lever throwing cam 20 and a lever returning cam 21, whereby a properly timed oscillation of the cross slide lever is effected to move the cross slide 10 forward and back.

The novel milling attachment comprising the main feature of the present invention is fixed upon said cross slide 10, and comprises a base-block 22 secured upon the forward end of said cross slide in the usual manner. Connected with said base-block is a supporting bracket 23, so related to the base-block as to incline upwardly and rearwardly therefrom; the lower end of said bracket being preferably received in a cut away portion or socket 24 formed in said base-block, and rigidly bolted to the latter, in desired adjusted inclination, by means of the fixing bolt 25. Said supporting bracket 23 is provided, at each side, with guide-ribs 26.

Mounted upon said bracket 23, so as to be longitudinally movable in relation thereto, is a carrying block 27, the same having a channel 28 in its rear face in which said bracket 23 and its guide-ribs 26 are received. Gib-plates 29 secured at the margins of said channel 28 so as to overlap said guide-ribs 26, hold said carrying-block in supported relation to said bracket, while permitting longitudinal sliding movement thereof for adjustment purposes. Said carrying-block is provided at its upper end with a rearwardly extending tongue or flange 30, in which is fixed, against longitudinal movement while still being capable of a turning movement, an adjusting screw 31 which is operatively received in an internally threaded opening 32 provided in said bracket 23. The upper end of said adjusting screw is provided with a finger-piece 33 for manipulating the same. As will be clearly apparent, by turning the screw in one direction or the other, the carrying-block 27 may be adjusted longitudinally up or down, relative to said bracket 23. The reference character 34 indicates a transverse slide-block, provided at its sides with guide-ribs 35. The carrying-block 27 is provided upon its face with a transverse channel 36 for the reception of said slide-block and its guide-ribs, and gib-plates 37 are secured at the margins of said channel 36 so as to overlap said guide-ribs 35 to hold said slide-block in supported relation to said carrying-block, while permitting transverse sliding movements thereof. Integrally connected with the face of said slide-block 34 is a bearing-member 38, having a bearing opening provided with an adjustable tapered bearing sleeve or bushing 39, reduced in diameter toward its upper end. Said sleeve or bushing 39 is provided with a longitudinal split or slot 40, and at its upper end with a threaded extension 41 upon which is secured the lock-nut 42 for fixing the sleeve or bushing in position. Journaled in said sleeve or bushing 39 is a rotatable spindle 43, having a shoulder 44 adjacent to its lower extremity which determines the position of the same relative to its bearing. Fixed upon the lower outwardly projecting extremity of said spindle is a suitable milling tool 45, provided around its circumference with the usual cutting teeth 46. The upper outwardly extending extremity of said spindle is threaded to receive the lock-nuts 47 and 47' adapted to hold the spindle against longitudinal displacement or undue play. When desired or when necessary, any wear of the sleeve or bushing caused by the rotation of the spindle may be taken up by turning the lock-nut 42 to draw up the tapered sleeve or bushing in the tapered opening of the bearing-member 38, such movement tending to squeeze together the split section of the bushing or sleeve to reduce the diameter of its bearing opening, and thus compensate for the wear, thereby assuring the elimination of vibration of the spindle and its milling tool due to looseness in the supporting bearing surfaces provided by the bushing or sleeve.

Secured upon the upper end of said spindle 43 is a shank-member 48 provided with an elongated slot 49 extending therethrough. Extending telescopically over said shank-member 48 is a sleeve 50 having a transverse pin 51 passing therethrough so as to ride in said slot 49 of said shank-member 48.

The reference character 52 indicates a driving shaft mounted in suitable bearing-brackets 53. Said driving-shaft is provided with a suitable driving pulley 54 over which runs a driving belt 55 operated from any suitable source of power. Said sleeve 50 and the end of said driving shaft 52 are coupled together by means of a universal joint 56. When said driving shaft 52 is rotated it serves to transmit rotary motion to said spindle 43 and the milling tool 45, through the universal joint 56, sleeve 50 and shank-member 48, as will be clearly apparent from an inspection of Fig. 2 of the drawings.

Connected with said carrying block 27, on the side toward the turret 5, is a stop-member 57, preferably in the form of a screw as shown, against which the slide-block 34 is normally positioned and stopped, said side-block being normally returned against said stop-member, after operation, by a push-spring 58 anchored upon the opposite side of said carrying-block so that its free end may exert a pressure against the bearing member 38 connected with said slide-block. When the slide-block 34 is in normal stopped engagement with said stop-member 57, it positions the spindle 43 and its milling tool 45 in a plane in advance of the end of the material to be worked upon when the milling attachment is carried forward by the movement of the cross-slide into working alinement with said material as held by the chuck 4.

As indicated in Fig. 6 of the drawings, the milling attachment serves to produce a generally conically shaped point having curved concave sides, and thus is adapted in connection with the other operations of an automatic screw-machine, principally to manufacture a novel type of phonograph needle, which in itself forms the subject matter of a separate invention, although it will be apparent its operation may be employed for other purposes wherein the shape produced is desired.

In the operation of the machine and said milling attachment, the wire or rod 3, providing the material operated upon, is automatically positioned in the chuck 4, and rotated by the chuck spindle. The cross slide 10 is normally withdrawn to the position indicated in Fig. 2 of the drawings, thus removing the milling tool attachment from operative relation to the work. At the proper time, however, the cam-disk 19 in its rotation carries the throwing cam 20 into engagement with the off-set roller 18 on the lower arm of the cross slide lever 16, thereby imparting movement to the latter which swings its upper arm forward, so that a forward movement is imparted to the cross slide 10 through the agency of the segment gear 17 with the rack-block 12. This forward movement of the cross slide 10 carries forward into operative alined position, relative to the work, the milling attachment, although the milling tool itself, owing to the retracted position of the slide-block 34 against the stop 57 is positioned in advance of the work comprised in that portion 59 of the wire or rod 3 held in the chuck 4 (as shown in Fig. 3 of the drawings). After the milling tool has been thus alined with the work, a timed operation of the turret mechanism of the screw machine advances a spindle 6 upon the end of which is secured a suitably shaped push-finger 60. This push-finger 60 engages the side of the bearing-member 38, and pushes the slide-block 34 toward the chuck 4, against the tension of the spring 58, thus carrying the rotating milling tool against the end of the portion 59 of the rod or wire 3, and slowly feeding the same in such direction until the desired depth of cut is produced by the said milling tool, (as shown in Fig. 4 of the drawings). Since the chuck 4 rotates, the work 59 is rotated also while in engagement with the rotating milling tool 45, and since the rotation of the latter is at right angles to the rotation of the work, the milling tool makes cutting contact with all points of the circumference of the portion 59, and in consequence mills a point the surface of which conforms in curve to the cylindrical curve of the milling tool as indicated in Fig. 6 of the drawings. The cross slide 10 is maintained immovable while the milling tool is moving in cutting relation to the work, so that the milling tool is maintained in proper alinement with the work while operating. This immobility of the cross slide is due to the fact that the throwing cam 20 possesses a curved portion 20' concentric to the axis of said cam-disk 19 upon which the off-set roller 18 dwells while the cutting operations of the milling tool are taking place. When the cutting operation of the milling tool is completed, the turret mechanism being timed to that end, the push-finger 60 is retracted, permitting the slide-block 34, under the pressure of the spring 58, to move back into normal stopped relation to the stop-member 57, thus withdrawing the milling tool from the work. By the time said slide-block resumes such normal stopped position, the cam-disk 19 has rotated far enough to bring the end of said curved portion 20' of the throwing cam 20 to the roller 18, so that the latter leaves the cam 20 and is immediately engaged by the returning cam 21, the inwardly curved surface of which engages the roller 18 imparting an inward movement thereto, which oscillates said lever 16 to retract said cross-slide 10, thereby withdrawing said milling attachment from alined relation to the work, and removing the same so that other tools carried by the turret mechanism may in turn be moved into operative relation to the work.

It may also be pointed out that since the driving shaft 52 is stationary and since the milling tool spindle is moved forward preparatory to the operation of the milling attachment, it is necessary to allow for this movement in the power transmitting mechanism, and to this end the shank-member 48 is constructed to slide in and out of said sleeve 50 in compensating for the changed position entailed, the cross pin 51 riding in the slot 49 during such movement, while nevertheless imparting the rotary movement of the sleeve to the shank-member so that the milling tool spindle is continuously rotated.

It will be understood that some changes may be made in the several arrangements and combinations of the various devices and parts, as well as in the details of the construction of the same, without departing from the scope of the present invention, as above described, and as defined in the appended claims. Hence, the present invention is not limited to the exact arrangements and combinations of the various devices and parts as set forth in the above specification, nor is it confined to the exact details of the construction of the said parts as illustrated in the accompanying drawings.

I claim:—

1. In an automatic screw machine, the combination with a cross slide of means for producing a timed reciprocation of said cross slide, a supporting means on said cross slide, a transverse slide block having bearing means carried by said supporting means, a spindle journaled in said bearing means, a milling tool connected with the lower end of said spindle, transmission means for imparting rotary movement to said spindle, a push-finger operated from the turret of said screw machine to move said slide-block to feed said milling tool against the work, and means for returning said slide block to normal initial position to withdraw said milling tool from the work.

2. In an automatic screw machine, the combination with a cross slide of means for producing a timed reciprocation of said cross slide, a supporting means on said cross slide, a longitudinally adjustable carrying block connected with said supporting means, a transverse slide block having a bearing means movable upon said carrying block, a stop-means for determining the normal initial position of said slide block, a spring-means for normally returning said block against said stop-means, a spindle journaled in said bearing means, a milling tool connected with the lower end of said spindle, transmission means for imparting rotary movement to said spindle, and a push-finger operated from the turret of said screw machine to move said slide block to feed said milling tool against the work.

3. In an automatic screw machine, the combination with a cross slide of a supporting means carried thereby, a transverse slide block having bearing means carried by said supporting means a spindle journaled in said bearing means, a milling tool connected with the lower end of said spindle, a pivoted cross slide lever, a gear and rack connection between said cross slide and said lever, a rotating cam disk having a throwing cam for operating said lever to move forward said cross slide to position said milling tool in alinement with the work, said throwing cam having a portion concentric to the axis of said cam disk upon which said lever dwells to hold said cross slide in forwardly moved position, a returning cam on said cam disk to reverse the movement of said lever to retract said cross-slide, a push-finger operated from the turret of said screw machine to move said slide block to feed said milling tool against the work while said cross slide is held in forwardly moved position, means for returning said slide-block to normal initial position, and transmission means for imparting rotary movement to said spindle.

4. In an automatic screw machine, the combination with a cross slide of a supporting means carried thereby, a transverse slide block having bearing means carried by said supporting means, a spindle journaled in said bearing means, a milling tool connected with the lower end of said spindle, a pivoted cross slide lever, a gear and rack connection between said cross slide and said lever, a rotating cam disk having a throwing cam for operating said lever to move forward said cross slide to position said milling tool in alinement with the work, said throwing cam having a portion concentric to the axis of said cam disk upon which said lever dwells to hold said cross slide in forwardly moved position, a returning cam on said cam disk to reverse the movement of said lever to retract said cross-slide, a push-finger operated from the turret of said screw machine to move said slide block to feed said milling tool against the work while said cross slide is held in forwardly moved position, means for returning said slide-block to normal initial position, transmission means for imparting rotary movement to said spindle comprising a rotated driving shaft, a shank-piece connected with the upper end of said spindle, a sleeve, and a universal joint between said sleeve and said driving shaft, the end of said shank being connected in driven relation to said sleeve while capable of a limited longitudinal movement relative thereto.

5. In an automatic screw machine, the combination with a cross slide of a base block fixed thereon, a bracket member capable of angular adjustment connected with said base block, a longitudinally adjustable carrying block associated with said bracket member, a transverse slide block having a bearing means movable upon said carrying block, a stop-means for determining the normal initial position of said slide block, a spring means for normally returning said slide block against said stop-means, a spindle journaled in said bearing means, a milling tool connected with the lower end of said spindle, transmission means for imparting rotary movement to said spindle, a push-finger operated from the turret of said screw machine to move said slide block to feed said milling tool against the work, and means for imparting a timed reciprocating movement to said cross slide.

6. In an automatic screw machine, the combination with a cross slide of a base block fixed thereon, a bracket member capable of angular adjustment connected with said base block, a longitudinally adjustable carrying block associated with said bracket member, a transverse slide block having a bearing means movable upon said carrying block, a stop-means for determining the normal initial position of said slide block, a spring means for normally returning said slide block against said stop-means, a spindle journaled in said bearing means, a milling tool connected with the lower end of said spindle, transmission means for imparting rotary movement to said spindle, a push-finger operated from the turret of said screw machine to move said slide block to feed said milling tool against the work, and means for imparting a timed reciprocating movement to said cross-slide comprising a pivoted lever, a gear and rack connection between said cross slide and said lever, and a rotating cam-disk having a throwing cam and a returning cam adapted to operatively and alternately engage the lower end of said lever.

7. In an automatic screw machine, the combination with a cross slide of a base block fixed thereon, a bracket member capable of angular adjustment connected with said base block, a longitudinally adjustable carrying block associated with said bracket member, a transverse slide block having a bearing means movable upon said carrying block, a stop-means for determining the normal initial position of said slide block, a spring means for normally returning said slide block against said stop-means, a spindle journaled in said bearing means, a milling tool connected with the lower end of said spindle, transmission means for imparting rotary movement to said spindle, comprising a rotated driving shaft, a shank-piece connected with the upper end of said spindle, a sleeve, a universal joint between said sleeve and said driving shaft, the end of said shank being connected in driven relation to said sleeve while capable of a limited longitudinal movement relative thereto, a push-finger operated from the turret of said screw machine to move said slide-block to feed said milling tool against the work, and means for imparting a timed reciprocating movement to said cross slide.

8. In an automatic screw machine, the combination with a cross slide of a base block fixed thereon, a bracket member capable of angular adjustment connected with said base block, a longitudinally adustable carrying block associated with said bracket member, a transverse slide block having a bearing means movable upon said carrying block, a stop-means for determining the normal initial position of said slide block, a spring means for normally returning said slide block against said stop-means, a spindle journaled in said bearing means, a milling tool connected with the lower end of said spindle, transmission means for imparting rotary movement to said spindle, comprising a rotated driving shaft, a shank-piece connected with the upper end of said spindle, a sleeve, a universal joint between said sleeve and said driving shaft, the end of said shank being connected in driven relation to said sleeve while capable of a limited longitudinal movement relative thereto, a push-finger operated from the turret of said screw machine to move said slide-block to feed said milling tool against the work, and means for imparting a timed reciprocating movement to said cross slide comprising a pivoted lever, a gear and rack connection between said cross slide and said lever, and a rotating cam-device having a throwing cam and a returning cam adapted to operatively and alternately engage the lower end of said lever.

9. In an automatic screw machine, the combination with a cross slide of supporting means including a laterally movable bearing means, a spindle journaled in said bearing means, a milling tool fixed to said spindle, means for reciprocating said cross slide to carry said milling tool in alinement with the work, a push-finger operated from the turret of said screw machine to thrust against said laterally movable bearing means to feed said milling tool against the work, and transmission means for imparting rotary movement to said spindle.

In testimony that I claim the invention set forth above I have hereunto set my hand this 6th day of March, 1918.

HENRY BAMBERGER.

Witnesses.
FREDK. C. FRAENTZEL,
FREDK. H. W. FRAENTZEL.

Copies of this patent may be obtained for five cents each, by addressing the "Commissioner of Patents, Washington, D. C."